United States Patent
Moll et al.

(10) Patent No.: US 7,124,956 B2
(45) Date of Patent: Oct. 24, 2006

(54) PRODUCT COMPRISING PRODUCT SUB-PARTS CONNECTED TO EACH OTHER BY A CRIMP CONNECTION

(75) Inventors: Rainer Moll, Graz (AT); Joachim Heinz Schober, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/477,912

(22) PCT Filed: May 16, 2002

(86) PCT No.: PCT/IB02/01721

§ 371 (c)(1),
(2), (4) Date: Nov. 17, 2003

(87) PCT Pub. No.: WO02/093473

PCT Pub. Date: Nov. 21, 2002

(65) Prior Publication Data

US 2004/0144848 A1    Jul. 29, 2004

(30) Foreign Application Priority Data

May 17, 2001    (EP) .................................. 01890148

(51) Int. Cl.
*G06K 19/06*    (2006.01)
(52) U.S. Cl. ...................... 235/492; 235/491; 235/385; 29/600

(58) Field of Classification Search ................ 235/492, 235/491, 385; 343/700, 895
See application file for complete search history.

(56) References Cited

U.S. PATENT DOCUMENTS

| | | | | |
|---|---|---|---|---|
| 2,454,219 A | * | 11/1948 | Schultz et al. | 342/172 |
| 3,736,627 A | * | 6/1973 | Sosinski | 24/23 W |
| 3,989,339 A | * | 11/1976 | Haitmanek | 439/421 |
| 4,442,316 A | * | 4/1984 | Thuermer | 174/84 C |
| 5,499,934 A | * | 3/1996 | Jacobsen et al. | 439/585 |
| 5,771,674 A | * | 6/1998 | Smith et al. | 57/284 |
| 6,400,323 B1 | * | 6/2002 | Yasukawa et al. | 343/700 MS |

FOREIGN PATENT DOCUMENTS

| | | |
|---|---|---|
| DE | 3638693 | 5/1987 |
| DE | 19912201 | 8/2000 |

* cited by examiner

*Primary Examiner*—Thien M. Le
*Assistant Examiner*—Daniel A. Hess
(74) *Attorney, Agent, or Firm*—Kevin Fortin

(57) ABSTRACT

In the case of a product (1) having a first product sub-part (4) and a second product sub-part (3), the two product sub-parts (3, 4) each comprise two connection zones (8, 9, 10, 11) consisting of metal and of suitably thin construction for a crimping process and the connection zones (8, 9, 10, 11) are connected together in pairs by means in each case of a crimp connection, in which the connection zones (10, 11) of at least one product sub-part (3) exhibit the remnants (16), remaining after performance of the crimping process, of elevations (17) present prior to performance of the crimping process.

7 Claims, 2 Drawing Sheets

PRODUCT COMPRISING PRODUCT SUB-PARTS CONNECTED TO EACH OTHER BY A CRIMP CONNECTION

BACKGROUND OF THE INVENTION

The invention relates to a product having a first product sub-part and a second product sub-part, which two product sub-parts each consist of metal and each comprise a connection zone of suitably thin construction for a crimping process, which connection zones are connected together by means of a crimp connection.

Such a product has been sold commercially in the form of an electronic article surveillance label (EAS label) and is therefore known. With the known label, a backing film is accommodated between two protective layers consisting of paper, in which a transmission coil formed of etched or printed conductive tracks is provided on one main face of the backing film and in which, on the other main face of the backing film, there is provided a foil-type metal bridge serving to bridge the conductive tracks of the transmission coil and in which the transmission coil constitutes a first product sub-part and the metal bridge constitutes a second product sub-part. Furthermore, the transmission coil is provided with two connection zones, each of which is connected, through the backing film, with a counter-connection zone of the metal bridge by means in each case of a crimp connection. In the known configuration, the connection zones of the transmission coil and the counter-connection zones of the metal bridge are each of flat construction, which entails the problem that mechanical connection and also electrical connection of the connection zones of the transmission coil and the counter-connection zones of the metal bridge cannot always be perfectly achieved by the crimping process performed to produce the respective crimp connection, such that crimp connections which are defect-free and operational do not always exist.

BRIEF SUMMARY OF THE INVENTION

It is an object of the invention to eliminate the above-described shortcomings and to provide an improved product. To achieve the above-mentioned object, features according to the invention are provided for a product according to the invention, such that a product according to the invention may be characterized in the following way, namely:

A product having a first product sub-part and having a second product sub-part, in which the first product sub-part comprises a connection zone consisting of metal and of suitably thin construction for a crimping process and in which the second product sub-part comprises a counter-connection zone consisting of metal and of suitably thin construction for a crimping process and in which the connection zone and the counter-connection zone are connected together by means of a crimp connection formed by the performance of a crimping process and in which, of the connection zone and the counter-connection zone, at least one of these two connection zones comprises the remnants, remaining after the performance of the crimping process, of elevations present prior to the performance of the crimping process, which remnants lie between the two connection zones.

By providing the features according to the invention, it is ensured in a structurally simple and additionally also simply producible manner that, during production of the product and in particular during production of the crimp connection between the connection zones to be connected together, precisely defined contact areas arise between the connection zones to be connected by means of the elevations provided in the case of at least one connection zone, which has the consequence that the energy applied to produce the crimp connections by means of a crimping device is introduced in concentrated manner in the contact areas, which results altogether in a crimp connection between two connection zones which displays high connection reliability, in which the high connection reliability is true both of the mechanical connection and of the electrical connection between two connection zones.

In the case of a product according to the invention, the formation of a crimp connection between two connection zones is performed for example by means of a crimping device by the application of mechanical pressure and additionally of ultrasound, in which as a consequence of the application of ultrasound a weld joint is then formed between the two connection zones consisting of metal. However, it has also proven very advantageous for a connection means suited to assisting the mechanical connection between the two connection zones is additionally provided between the connection zone and the counter-connection zone. In this way, the advantage is achieved that a crimp connection may be achieved purely through the application of pressure by means of a crimping device.

In the case of a product as described above, the additional connection means may comprise for example an initially pasty or more or less liquid adhesive. However, it has proven particularly advantageous for the connection means to comprise a film consisting of plastics and softenable at least once by heating and for the remnants to be pressed through the film. Such a configuration is distinguished above all by very great simplicity of production. Moreover, this configuration provides the advantage that a film of plastics provided anyway between two connection zones in the case of certain products is at the same time exploited as an additional connection means for assisting the mechanical strength of a crimp connection, in which an adhesive action and consequently an adhesive connection is achieved by means of the softenable and thereby fusible film.

In the case of a product according to the invention, it has proven particularly advantageous for the product to take the form of a transponder for contactless communication with a communications station. Such a configuration has proven particularly favorable in practice.

The invention further relates to a starting product for a product sub-part, which starting product is intended for production in a product and for use in such a product. Such a starting product according to the invention comprises features according to the invention, such that a starting product according to the invention may be characterized in the following way, namely:

A starting product for a product sub-part, which starting product is provided for use in a product and which starting product comprises a counter-connection zone which consists of metal and is of suitably thin construction for a crimping process, in which the counter-connection zone is provided with elevations, which elevations are provided to be pressed against a connection zone during production of a crimp connection.

By providing the features according to the invention, a starting product is obtained in a structurally simple and simply producible manner for a product sub-part or for a product, with which a crimp connection may be obtained which is reliable and long-lasting from both the mechanical and the electrical standpoint.

In the case of a starting product according to the invention, it has proven particularly advantageous for the elevations to be formed by an embossing process. Such an embossing process is particularly advantageously suitable for producing such elevations in the case of a starting product according to the invention, because with such an embossing process the height in particular, but also other dimensions of the elevations, may be produced in a precise and precisely reproducible manner. This is important because the dimensions of the elevations and additionally also the positions and density of the elevations have a substantial influence on the positive effects of the elevations in forming and maintaining a crimp connection.

The above-stated aspects of the invention and further aspects thereof emerge from the examples of embodiment described below and are explained with reference to these examples of embodiment.

BRIEF DESCRIPTION OF THE DRAWINGS

The invention will be further described with reference to two examples of embodiment shown in the drawings, to which, however, the invention is not restricted.

BRIEF DESCRIPTION OF THE INVENTION

Figure 1:
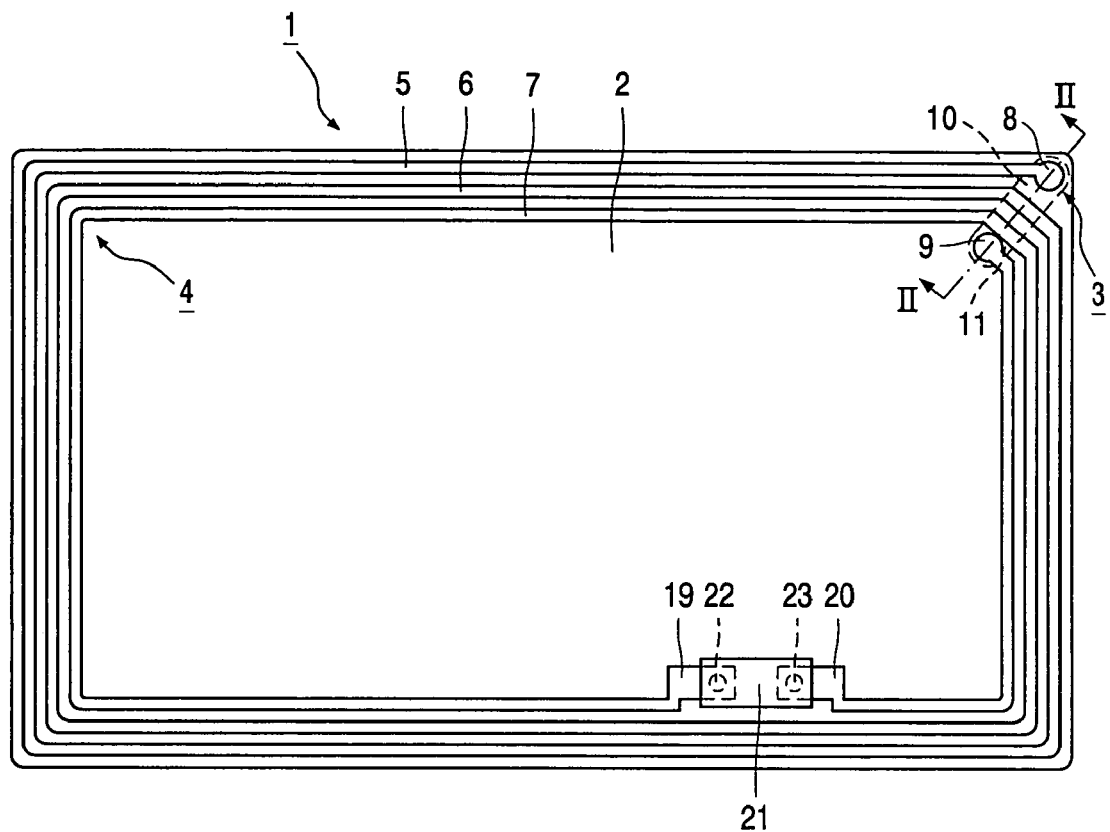
FIG. 1 shows schematically, in a view from above, a product according to one example of embodiment of the invention in the form of a so-called inlet, in which a bridge part is provided.

FIG. 1 shows a product 1 according to the invention, this product 1 being a so-called inlet 1, which is provided to produce a transponder for contactless communication with a communications station. During production of such a transponder, the inlet 1 is embedded in a transponder body, in which the embedding may be performed by a laminating process or an injection molding process or indeed by an adhesion process and the transponder body may accordingly consist of plastics or of bonded layers of paper. Thus, not only does the inlet 1 constitute a product according to the invention but also a transponder produced with this inlet 1 and not shown constitutes such a product according to the invention.

The inlet 1 comprises a first product sub-part 2, namely a film 2, and a second product sub-part 3, namely a bridge part 3. The functionality of the bridge part 3 is examined in more detail below. The film 2 serves as support for a transmission coil 4, which is provided in the present case on the top of the film 2 and which consists of a plurality of windings, in which only three windings 5, 6 and 7 in total are shown in FIG. 1 for the sake of clarity. The transmission coil 4 and its windings 5, 6 and 7 are produced in the present case by means of a printing process. However, they may be produced in other ways, for example by means of an etching process or other production processes known in this context. The transmission coil 4 and thus its windings 5, 6 and 7 consist of metal, namely of copper. The free end of the outer winding 5 develops into a first connection zone 8, which is in this case substantially circular. The free end of the inner winding 7 develops into a second connection zone 9, which is in this case likewise substantially circular. The two connection zones 8 and 9 have been produced in the course of and at the same time as production of the transmission coil 4 and therefore likewise consist of metal, namely of copper, and are of suitably thin construction for a crimping process.

To render the transmission coil 4 functional, the two connection zones 8 and 9 have to be connected together electrically. For this purpose, the bridge part 3 is provided, which, in contrast to the transmission coil 4, which in the present case is provided on the top of the film 2, is located on the underside of the film 2, as is clear from FIG. 2. The bridge part 3 comprises a first counter-connection zone 10 and a second counter-connection zone 11. The two counter-connection zones 10 and 11 of the bridge part 3 here likewise consist of metal, namely of a copper-tin alloy, and are likewise of suitably thin construction for a crimping process. The two connection zones 8 and 9 of the transmission coil 4 and the two counter-connection zones 10 and 11 of the bridge part 3 are in each case connected together by means of a crimp connection formed by the performance of a crimping process. In the case of the inlet 1 according to FIG. 1, to produce the two crimp connections use was made of a crimping tool with two tool parts exhibiting high surface roughness and capable of being pressed together, which is clear from the fact that notch-like or wedge-like recesses 12, 13, 14 and 15 are present in the area of the free boundary surfaces of the four connection zones 8, 9, 10 and 11.

In the case of the inlet 1, it is advantageously particularly the case that the two counter-connection zones 10 and 11 of the bridge part 3 comprise the remnants 16, remaining after the performance of the crimping process, of elevations 17 present prior to the performance of the crimping process, which remnants 16 lie between the counter-connection zones 10 and 11 displaying the remnants 16 and the other connection zones 8 and 9.

Figure 2:
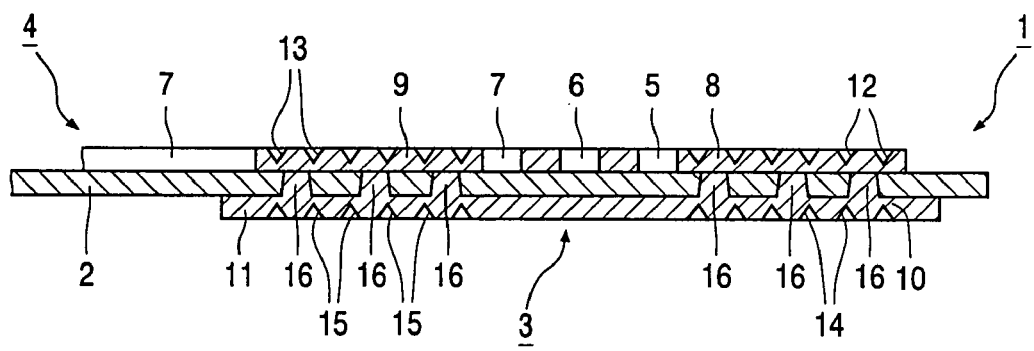
FIG. 2 is a sectional view along line II—II of FIG. 1 of a detail of the inlet according to FIG. 1.

In the case of the inlet 1 according to FIGS. 1 and 2, there is additionally provided between each connection zone 8 or 9 and the respective opposing counter-connection zone 10 or 11 a connection means (connection agent) suited to assisting the mechanical crimp connection between the two pairs of connection zones 8, 10 and 9, 11, in which the connection means comprises the film 2 consisting of plastics and softenable once by heating and in which the remnants 16 are pressed through the film 2. A repeatedly softenable film may also be provided, or indeed an insulating material, which allows throughplating due to its resilience. During production of the crimp connections between the connection zones 8, 10 and 9, 11 respectively, not only is mechanical pressure applied by means of the above-mentioned crimping tool, but additionally also heat, which has the consequence of heating and thereby fusing the film 2, which has the consequence that, by means of the film 2, an adhesive effect arises between the film 2 and the portions of the transmission coil 4 and the bridge part 3 adjoining the film 2, such that adhesive connections thus additionally arise in the area of the crimp connections, which provide marked assistance to the mechanical crimp connections between the two connection zones 8 and 9 of the transmission coil 4 and the two counter-connection zones 10 and 11 of the bridge part 3.

Figure 3:
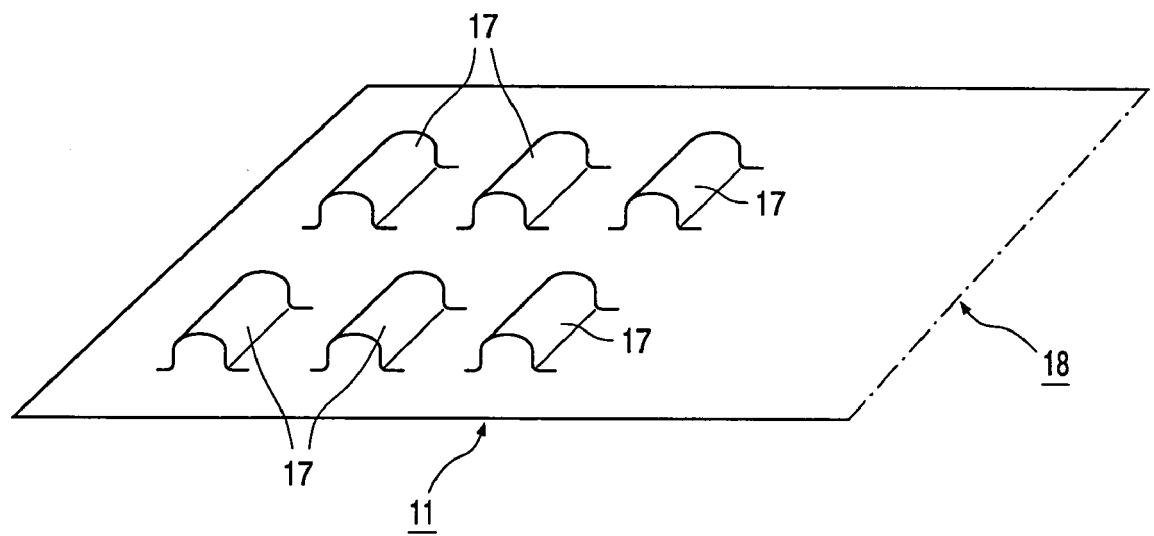
FIG. 3 is an oblique view of a portion of a starting product for the bridge part of the inlet according to FIG. 1.

As mentioned above, remnants 16 of elevations 17 are provided in the case of the inlet 1 according to FIGS. 1 and 2. In this respect, reference is made to FIG. 3. FIG. 3 shows part of a starting product 18 for the bridge part 3, which starting product 18 is provided for use with an inlet, such as the inlet 1 according to FIGS. 1 and 2. The starting product 18 comprises the two counter-connection zones 10 and 11, of which FIG. 3 shows only the second counter-connection zone 11, however. The two counter-connection zones 10 and 11 of the starting product 18 are made of metal, as is the entire starting product 18, namely of a copper-tin alloy, and the counter-connection zones 10 and 11 are moreover of suitably thin construction for a crimping process.

As is clear from FIG. 3, each counter-connection zone 10 or 11 is provided with elevations 17, which elevations 17 are provided for pressing against a connection zone 8 or 9 respectively during production of a crimp connection. The elevations 17 were here formed in a particularly simple, advantageous way by an embossing process. In the present case, the elevations 17 are trough-shaped bulges. It goes without saying that other configurations and shapes are also possible, for example dome-shaped elevations. When performing a crimping process for producing the product according to FIGS. 1 and 2, in which crimping process both mechanical pressure and heat are applied by means of a crimping tool, the elevations 17 are pressed against the connection zones 8 and 9 of the transmission coil 4, in which the elevations 17 pass through the heated film 2 and are additionally markedly reduced in height until the remnants 16 of the elevations 17 are obtained.

The advantage of providing the elevations 17 lies in particular in that precisely defined contact areas or active areas are obtained by means of the elevations 17 between the connection zones 8 and 9 of the transmission coil 4 and the counter-connection zones 10 and 11 of the bridge part 3, whereby a defect-free electrical connection is achieved highly reliably between the connection zones 8 and 9 of the transmission coil 4 and the counter-connection zones 10 and 11 of the bridge part 3. In addition, the elevations 17 also offer the advantage that, during the application of mechanical pressure by means of the crimping tool, the energy introduced acts in a concentrated manner, which also proves advantageous with regard to the mechanical strength of the crimp connections produced.

With respect to the inlet 1 according to FIG. 1, it should also be mentioned that, in the case of this inlet 1, the internal winding 7 is of interrupted construction and comprises a first terminal lug 19 and a second terminal lug 20 in the area of its interruption. Between the two terminal lugs 19 and 20 there is provided a chip 21, which is provided with two terminals, namely with two so-called bumps 22 and 23, and which, in so-called flip-chip technology, is connected in electrically conductive manner to the two terminal lugs 19 and 20 by means of its bumps 22 and 23, in which the chip 21 is additionally connected mechanically to the film 2 by means of an adhesive connection, not shown in FIG. 1.

Figure 4:
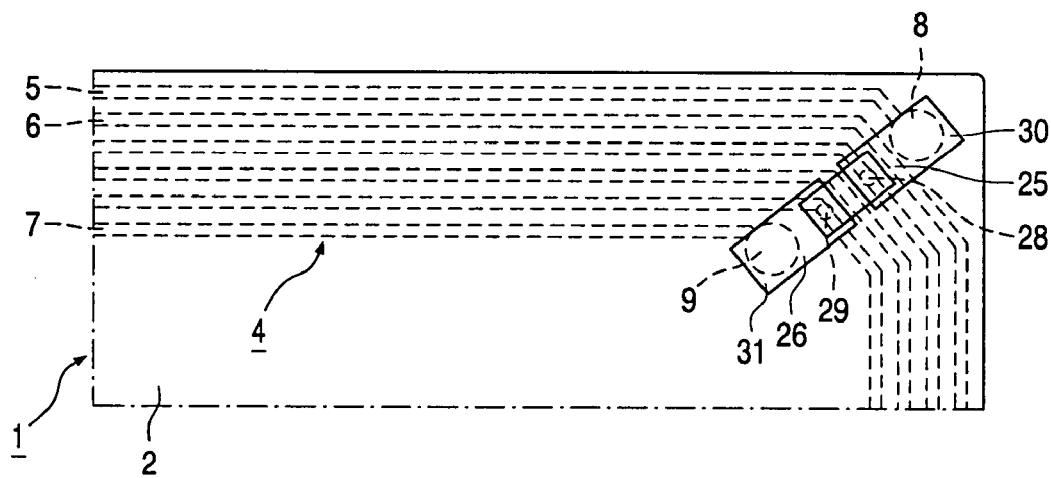
FIG. 4 shows, analogously to FIG. 1, part of a further inlet constituting a product according to a second example of embodiment of the invention.

FIG. 4 shows a further inlet 1, but only in part. In the case of this inlet 1, the transmission coil 4 is located on the underside of the film 2. A unit 24 is provided on the top of the film 2, which unit consists of a chip 25 and two terminal lugs 26 and 27. The chip 25 comprises two bumps 28 and 29 and is connected, in so-called flip-chip technology, in electrically conductive manner to the terminal lugs 26 and 27 by means of its two bumps 28 and 29, in which a mechanical connection, not described in any more detail, is additionally also provided. The two terminal lugs 26 and 27 consist of metal, namely of a copper-tin alloy, and are of suitably thin construction for a crimping process. The terminal lug 26 comprises a counter-connection zone 30. The terminal lug 27 comprises a counter-connection zone 31. The counter-connection zone 30 is connected, as with the inlet 1 according to FIGS. 1 and 2, through the film 2 with the first connection zone 8 of the transmission coil 4. The second counter-connection zone 31 is connected through the film 2 with the second connection zone 9 of the transmission coil 4 by means of a crimp connection. In the case of the inlet 1, the unit 24 constitutes a second product sub-part, which comprises counter-connection zones 30 and 31, in which the counter-connection zones 30 and 31 exhibit the remnants, remaining after the performance of the crimping process, of elevations present prior to the performance of the crimping process; this is not shown in separate detail for the inlet 1 according to FIG. 4, however.

It may be mentioned that the counter-connection zones 10 and 11 may also consist of tin or gold or silver or also of ductile materials having a coating of the above-mentioned metals and copper.

The invention is not limited to the products described here, but rather relates to all products in which a crimp connection is provided between two product sub-parts.

The invention claimed is:

1. An inlet for use in a transponder for contactless communication, comprising:

a first product sub-part and a second product sub-part, in which the first product sub-part comprises a connection zone consisting of metal and of suitably thin construction for a crimping process and in which the second product sub-part comprises a counter-connection zone consisting of metal and of suitably thin construction for a crimping process, wherein one of the first product sub-part and the second product sub-part includes elevations to be pressed against the other of the first product sub-part and the second product sub-part, and in which the connection zone and the counter-connection zone are connected together by means of a crimp connection formed by the performance of a crimping process that alters the elevations to obtain remnants, and in which, of the connection zone and the counter-connection zone, at least one of these two connections zones comprises the remnants, remaining after the performance of the crimping process, of the elevations present prior to the performance of the crimping process, which remnants lie between the two connection zones.

2. An inlet as claimed in claim 1, in which a connection means suited to assisting the mechanical connection between the two connection zones is additionally provided between the connection zone and the counter-connection zone.

3. An inlet as claimed in claim 2, in which the connection means comprises a film consisting of plastics and softenable at least once by heating and in which the remnants are pressed through the film.

4. An inlet as claimed in claim 1, in which the inlet is integrated into a transponder for contactless communication with a communications station.

5. A transponder for contactless communication with a communications station, comprising:
   a transponder body;
   an inlet embedded in a transponder body including a film and a bridge;
   a transmission coil supported by the film and including a plurality of windings, the transmission coil having a connection zone;
   the bridge has a counter-connection zone; and
   the counter-connection zone consists of metal having elevations crimped against the connection zone and remnants, the remnants establish a mechanical and electrical connection between the connection zone and the counter-connection zone.

6. A starting product as claimed in claim 5, in which the elevations are formed by an embossing process.

7. A transponder for contactless communication with a communications station, comprising:
   transponder body;
   an inlet embedded in a transponder body including a film and a bridge;
   a transmission coil supported by the film and including a plurality of windings, the transmission coil having a connection zone;
   the bridge has a counter-connection zone; and
   the counter-connection zone has metal elevations crimped against the connection zone to electrically and mechanically connect the transmission coil and the bridge.

* * * * *